Patented Dec. 27, 1927.

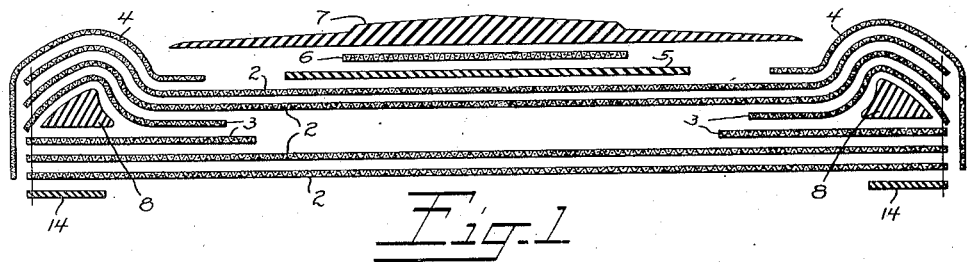
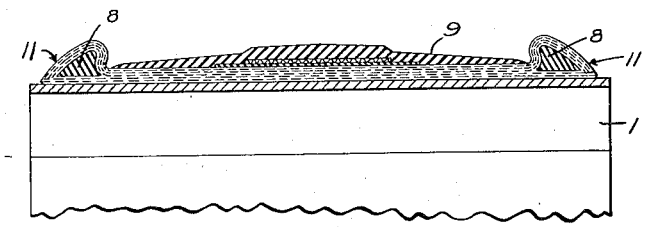
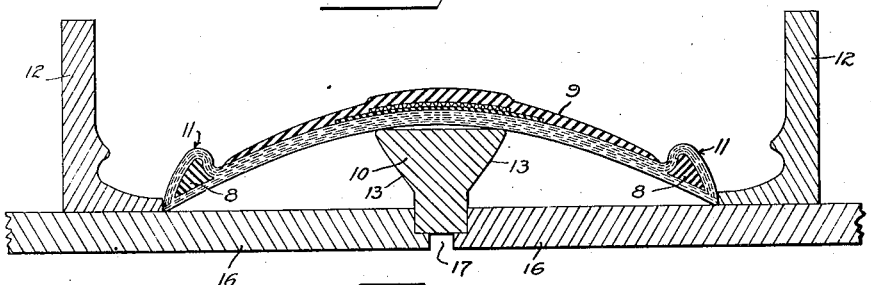
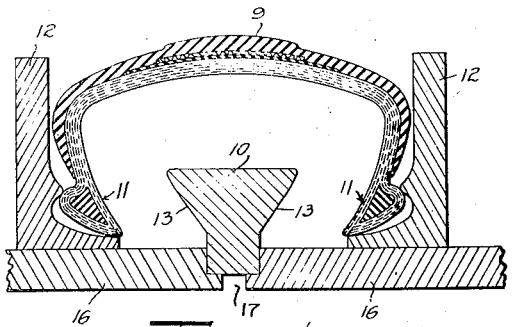
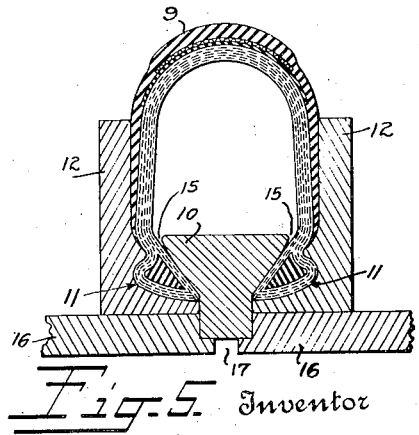
Inventor
WILLIAM J. STEINLE

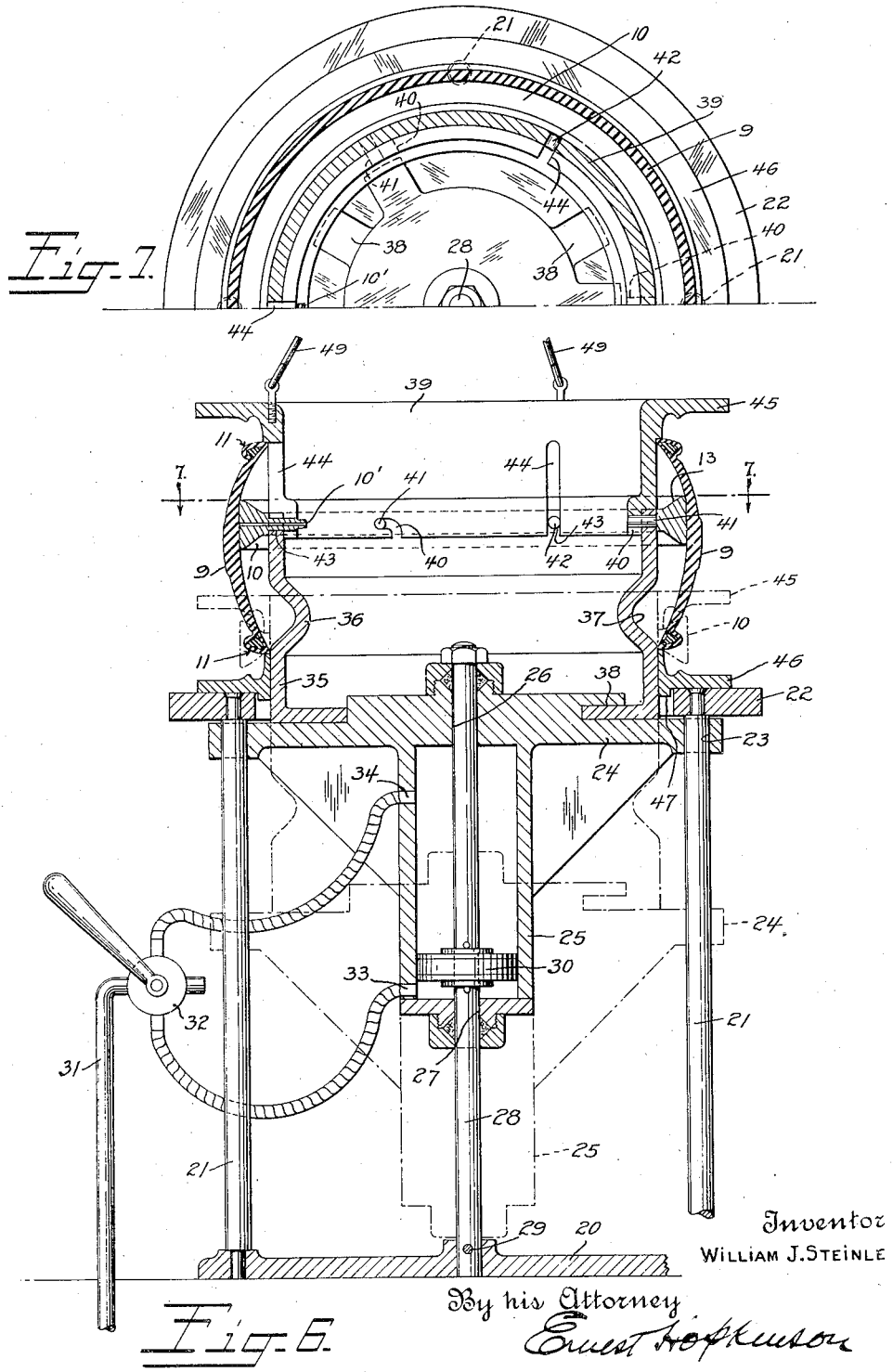

1,654,351

UNITED STATES PATENT OFFICE.

WILLIAM J. STEINLE, OF FLUSHING, NEW YORK, ASSIGNOR TO THE HARTFORD RUBBER WORKS COMPANY, A CORPORATION OF CONNECTICUT.

METHOD AND APPARATUS FOR MAKING TIRE CASINGS.

Application filed May 23, 1922. Serial No. 562,965.

This invention relates to the manufacture of tire casings for motor vehicles and more particularly to a process or method for their fabrication.

A most advantageous way to build tire casings for motor vehicles is to initially assemble their constituent parts—fabric or cords and rubber composition—in the form of a band similar to the face of a pulley, i. e., substantially straight or flat in cross-section but peripherally circular, or nearly so. This method is used in commercial production at the present day and is often referred to as the "pulley-band process". One object of the present invention is to modify and adapt the present pulley-band process, retaining its advantages in initially building the tire while extending and increasing its usefulness so as to facilitate and improve upon the manufacture of casings therewith, especially the clincher type, but also the straight-side or inextensibly beaded type. Another object of the present invention is to enable casings of any type to be built with their stress-resisting-elements—cords or threads—in the finished casings more nearly radial, i. e., at a greater angle to their margins than the angle at which they were cut or initially assembled in "pulley-band" form, thereby to provide a superior construction for resisting rim chafing in clincher casings and rendering straight-side or inextensibly beaded casings stiffer in the region of the beads. Still another object of the invention is to shape a casing from band to tire form without differentially pressing upon the opposite faces of its tread, or in any way applying a pressure directly to the intermediate portion of the casing to cause it to bulge radially outward, the shaping being effected by progressive annular outward folding from the band to the tire form, gradually increasing the girth of the band and decreasing its width. A further object of the invention is to provide a method of making a casing which will swing the stress-resisting-elements not only more nearly radial at the beads but also swing them in the tread-forming region of the band less than in the old method, thereby enabling the casing to more readily take a high and slim form in cross-section as distinguished from a low and fat form. And a further object of the invention is to provide a method of manufacturing casings which will enable the stress-resisting-elements to be uniformly tensioned, as in the old "pulley-band" process, but to a lesser degree when desired, and whether the plies of the casings be initially assembled in "pulley-band" form with their stress-resisting-elements at the same angle, or at various angles in the foliated carcass.

Without intention to limit more than is required by the prior art, the invention may be briefly described as consisting in making a "pulley-band" whose girth or circumference at the margins is less than at its center, then forming the "pulley-band" approximately into tire shape, and then vulcanizing the casing. More particularly, I prefer to build the "pulley-band" flat on a collapsible drum and then contract its margins; i. e., lessen their circumferential extent, so as to bring the stress-resisting-elements into a position more nearly radial, i. e., making a greater angle with the margins than before contraction of the margins. In other words, I prefer to build the "pulley-band" flat and by contraction of its margins, to "condense" the fabric, or cords,—which constitute the stress-resisting-elements—adjacent the edges of the band. The "pulley-band" may be variously shaped to approximately tire form, but I prefer to employ abutment members, or platens, which are closed upon the flat, or crescent-shaped, "pulley-band", so as to first turn in the bead portions and to progressively engage more and more of the margins of the "pulley-band", thereby distending the central portion of the band without the aid necessarily of an inflating tube, or compressed air, or a differential pressure of any kind applied to the band, or casing.

Other objects of the invention will appear in the following detailed description of an embodiment thereof illustrated in the accompanying drawings in which:—

Fig. 1 is a cross-section of a clincher casing with the constituent parts shown spaced or separated for convenience in illustration, Fig. 2 is a cross-section of a completed clincher casing as built in the preferred form, straight from edge to edge, on a collapsible drum, Fig. 3 is a cross-section of a clincher casing in the shape it naturally assumes when removed from the building-drum, being shown in position about a bull-ring and between abutment or pusher members, preliminary to the shaping operation, Fig. 4 is a cross-section of a casing in an intermediate stage of the shaping operation, Fig. 5 is a cross-section showing the casing in its approximate tire shape and with its beaded portions secured to a molding or sealing-ring which is adapted to close off the space between the beaded portions, and, in the consequent curing operation, to render the cavity inside the casing fluid tight, Fig. 6 is a vertical cross-section of an apparatus for facilitating the shaping of the band to approximate tire form, and Fig. 7 is a half section on the line 7—7 Fig. 6.

Although the invention in its broadest aspects is not limited in its application to any particular type of casing, it is especially advantageous for the manufacture of clincher casings; that is, those casings having extensible beads incorporated in their margins permitting the finished casings to be mounted on clincher rims. The preferred method of making "clincher" casings will now be described.

In making a clincher casing, I preferably first build layers of rubberized fabric, woven or cord, into a "pulley-band." This may be done in any known manner, but I prefer to assemble the constituents of the casing on a more or less cylindrical support, preferably a collapsible drum, such as disclosed in a prior patent to Ernest Hopkinson, No. 1,310,701, granted July 22, 1919, and indicated conventionally at 1 in Fig. 2 of my drawings. The constituent plies or layers of stress-resisting-elements 2, filler strips 3, chafing strips 4, cushion stock 5, breaker 6, tread 7, and beads 8, are built up and rolled down on the drum which has been adjusted to a diameter greater than that of the beaded portions, but less than the tread, of the final casing. The beads 8 of clincher casings before incorporation are preferably separately and completely (or partially) cured either in an annular form at a suitable diameter, or in straight lengths and spliced to size, for clinchers, preferably of a diameter substantially the same as, or a very little less than they are to have in the finished and completely cured casing. The constituent plies of the casing having been assembled "oversize" (over the final bead size) on the drum, the cured beads are stretched to incorporate them in the margins of the band or flat casing 9. To be more explicit, and as an example, in a 30 x 3½ clincher tire, the drum may be initially adjusted to a diameter of about 24½", and the annular vulcanized rubber beads 8—which have been cured separately at a diameter approximating 22½"—are stretched 7", more or less, when incorporated in the flat band.

After the clincher casing has been built as above described, the drum is collapsed and the "pulley-band," or carcass, 9 freed to allow it to naturally assume the curved, or crescent, form shown in cross-section in Fig. 3, the beads 8 contracting so as to reduce the girth at the margins of the band to approximately their rim-fitting circumference in the finished casing. The decrease of the girth of the beaded margins increases with the lapse of time and allowance should be made for the interval between collapse of the drum and the subsequent shaping of the casing, as those skilled in the art will readily comprehend.

The crescent-shaped casing 9 is then prepared for shaping to approximately tire form by "button-holing" it around a sealing-ring 10, having its sides undercut or beveled to rightly position the beaded margins when brought thereagainst. Or, the sealing-ring 10 may have formed a removable part of the building-drum and been already so located, as disclosed in my application Serial Number 563,767, filed May 26th, 1922, and since become Patent No. 1,470,889, dated October 16, 1923. The beaded portions, or margins of the band, indicated as a whole at 11, are then moved towards one another by oppositely advancing thereagainst annular abutment, or pusher, members 12, of any suitable shape in cross-section, preferably as shown in the drawings. Because of the initial crescent shape of the band 9, the abutment members 12 first engage with the toes of the beaded portions 11 and turn the bead gradually from the position shown in Fig. 3 to that shown in Fig. 4. After the beaded portions 11 have been more or less turned as shown, further approach of the abutments 12 brings them into engagement with more and more of the side walls of the casing and progressively, the central portion of the casing is enlarged in girth and diminished in width by an outward rolling or annular folding from its margins towards its center. When the abutment members 12 have been approached, as far as they can be, the band 9 has been transformed to approximately tire shape and its beaded portions 11 pressed against the sealing device 10, whose undercut side walls 13 are preferably machined off at the angle and in the relation it is desired to cure the beaded portions 11 as indicated in the drawings. Preferably, the surfaces 13 of the sealing-ring and the inner faces of the beaded portions 11 are covered with cement. A gum sealing-strip, indicated at 14 in Fig. 1, may be, and is desirably, built into the original flat casing if it is to be ultimately cured on gas direct. It will be noticed from a scrutiny of Fig. 5, that a gap appears at 15 between the casing 9 and the adjacent surface of the sealing-ring 10. In the last closing movements of the abutment members 12 upon the casing, the toe of the beaded portion is pressed upon in such a way as to compact it nicely and accurately to size against the ring 10, and to relieve the "clinch"—where the side wall joins the bead proper—from being crushed, both in the shaping and the subsequent curing operations.

The band thus shaped approximately to tire form and now constituting a green or unvulcanized casing, is allowed to stand for a short time—15 seconds or longer—until set. The assembled green casing and sealing-ring are then introduced into a sectional mold and the casing cured in any suitable manner, preferably while subjected to an internal fluid pressure supplied through a suitable valve-controlled opening 10' Fig. 6, in the sealing-ring 10.

The foregoing refers to the preferred method of manufacturing a clincher casing. But some of the advantages of the invention may be realized by varying one or more of the steps mentioned above in the preferred procedure. For instance, the "pulley-band" 9, instead of being built absolutely flat, may be built on a crowned-drum, i. e., a drum whose outer surface is convex in cross-section, the constituent plies, etc., being built up and rolled down, and the beads being incorporated in the margins at, or nearly at, the diameter of the beaded portions of the finished casing. Or, I may build the "pulley-band" "oversize" in the flat and temporarily employ constricting members which are removed after the crescent-shaped form is obtained and replaced by inextensible beads, this procedure resulting in a better construction in the region of the bead wires than in the old method.

The purely mechanical shaping of the band to approximately tire form without a radially outward push upon the central portion of the band—as with a pneumatic tube, expansible core, air under pressure, or other means creating a differential pressure upon the opposed faces of the central portion of the band as heretofore—is distinctly advantageous in connection with the manufacture of clincher casings for the reason that a minimum of stress is applied to, or strain developed in, the cords or threads of the rubberized fabric in the carcass, and, consequently, there is a minimum of pull upon the extensible beads in the margins of the casing. And pure mechanical shaping is facilitated by previously imparting to the green band the crescent-shaped form shown in cross-section in Fig. 3, the shaping, of course, being variable with the size of the tire. However, small casings may be shaped with some degree of satisfaction purely mechanically, and this whether the incorporated beads be extensible or inextensible.

There is a distinct advantage in initially making a "pulley-band" of the cross-shaped form shown in Fig. 3. The stress-resisting elements are swung less in the region of the tread and, adjacent the beads, assume a more nearly radial position as a result of the shaping from band to tire form. And the shaping from band to tire form by a press and without the application of a differential pressure, i. e., purely mechanically, is facilitated. But the first-mentioned advantages in initially making the "pulley-band" of crescent-shaped form may be obtained when the band is shaped to tire form in other ways, as, for instance, with an inflating tube, as disclosed in a patent to Hopkinson No. 1,374,505, granted April 12th, 1921, or with air under pressure directly in contact with the interior of the band, as disclosed in a patent to Sloper No. 1,372,567, granted March 22nd, 1921. Or, the advantages of building a casing on a cylindrical drum and substantially flat in cross-section, and, subsequently, condensing the margins of the band to bring it to a crescent-shaped form, may be realized by shaping the band to tire form with a metallic expansible core capable of exerting a sufficient radially outward push upon the intermediate portions of the band to accomplish the desired extent of transformation.

After the casing has been shaped to tire form, it has to be cured and generally its exterior molded to a precise shape and with a superficial design on its tread. If the casing is of the clincher type illustrated, this is preferably done on a sealing-ring of the form shown at 10 in the drawings, to which the insides of the beaded margins have been secured with cement or a sealing strip of gum. If the casings are of the straight-side or inextensibly beaded type, I prefer to mount their margins on an annular ring of the type disclosed in a patent to Hopkinson No. 1,349,721, August 17th, 1920, when the tire is to be cured with a fluid under pressure in direct contact with its interior. But either type of casing may be cured on a core of a rigid or collapsible type, the former not being at all desirable however, while the latter is preferred by many manufacturers and in its usual form consists of a tube made of fabric and rubber, as well known.

The shaping of the "pulley-band" from its flat or crescent form to approximately tire form may be effected in any suitable or convenient apparatus. It is desirable to guide the beaded portions of the band or casing in shaping it and to this end I prefer to mount the annular rings or pusher members 12 on a cylindrical surface, as indicated at 16, Fig. 3, preferably divided, as indicated at 17, to accommodate a sealing-ring 10, if the latter is to be employed for any purpose, such as curing. The cylindrical guiding support 16 may be arranged with its axis vertical or horizontal, as desired, and may be of any convenient mechanical construction.

In Figs. 6 and 7 of the drawings, I have illustrated apparatus that may be used with facility in effecting the shaping of the casing to tire form and this will now be described in detail. The apparatus illustrated consists of a base 20, from the periphery of which rise upright stanchions 21, whose upper ends are rigidly secured to a ring 22, the stanchions 21 serving as guides for the apertures 23 in the flanged head 24 of a cylinder 25 that is bored out at its opposite ends, as indicated at 26 and 27, to reciprocate upon a rod 28 fastened at its lower end, as indicated at 29, to the base 20. In a suitable position upon the rod 28 is rigidly fastened a stationary piston 30. Fluid, such as air or water under pressure, is adapted to be supplied through the line 31 and valve 32 to ports 33 and 34 in opposite ends of the cylinder, and thereby the cylinder 25 with its enlarged head 24 is reciprocated up and down.

To the reciprocable head 24, a more or less cylindrical drum is adapted to be fastened. This drum is preferably made with a lower portion 35 intermediately bent inwardly, as at 36, to provide what may be termed a "button-holing" channel indicated at 37, the lower portion 35 being adapted to be secured by a species of bayonet-slot construction, indicated at 38, to the head 24, and with a removable upper portion 39, which is adapted to be detachedly secured to the lower portion 35, for this latter purpose being provided with any suitable number of angulated slots 40, taking or receiving pins 41 projecting inwardly from the upper edge of the lower portion 35. The sealing-ring 10 is provided with pins 42 which are adapted to rest in slots 43 in the upper edge of the lower drum 35, and slots 44, of relatively great length are provided in the upper drum section 39 to allow the latter to be advanced toward the sealing-ring 10, as indicated in dotted lines in Fig. 6. The valve stem 10' serves as one of the ring-supporting pins.

The side plates or pusher rings are formed in the apparatus shown in Fig. 6, the one, as at 45, integral with the upper drum section 39, and the other, as at 46, laid upon the stanchion head 22 with its depending gib 47 to hold it in concentric relation with its mate. These pusher members 45 and 46 are similar in contour to those illustrated in Fig. 3 of the drawings and operate upon the beaded portions of the casing 9 in much the same way.

With the apparatus shown in Fig. 6, the procedure is as follows:—Assuming the cylinder 25 with its head 24 in the position shown in solid lines in Fig. 6, I first preferably locate the sealing-ring 10 upon the lower drum section 35, then "button-hole" the casing about the sealing-ring—which operation is facilitated by the "button-holing" channel 37 provided in the lower drum section 35—and then lower the upper drum section 39 by any suitable suspension means, as indicated at 49, and position it upon the lower drum section 35 and lock it in place. When fluid is admitted to the port 33 in the lower end of the cylinder, the latter with its head 24, drum sections 35 and 39, and upper pusher ring 45, will be moved downwardly as a unit, the lower ring 46 remaining stationary. The beaded portions of the "pulley-band" or casing 9 will first be turned through an angle of more than 90°, then more and more of the side walls of the casing 9 will be flattened out, and then finally, either simultaneously or separately, the beaded portions of the casing will be brought into contact with the sealing device 10. If the insides of the beads or the sealing-ring, or both of them, have been moistened with cement, the "pulley-band" will thus have its beaded portions secured upon the sealing device. After a short interval, when the parts have set more or less, the apparatus may be disassembled, and, the approximately tire shaped casing mounted on the sealing device may be removed and introduced into a vulcanizing mold.

By my method of manufacture, I am enabled to obtain a different disposition or arrangement of the cords than is obtained in the old "pulley-band" process disclosed in the patent to Hopkinson No. 1,374,505, granted April 12th, 1921. In the old method, the stress-resisting-elements—cords or threads—were swung or bent more and more from the beads to the tread, at the beads the change of their inclination relative the margins of the band being little or none, and at the tread being a maximum. In other words, the cutting angle of the plies was preserved, or substantially preserved, immediately adjacent the beads, and from the same to the tread, the stress-resisting-elements were bent or shifted more nearly into parallelism with the beads. That is to say, the neutral zone-meaning the circumferential area where the stress-resisting-elements were least changed or swung from their built-in condition—was located immediately adjacent the beads. In the present invention, the neutral zone is located intermediate the beads and the tread, the stress-resisting-elements adjacent the beads swinging or bending into a more nearly radial position, and, adjacent the tread, swinging oppositely into a more nearly parallel position with respect to the beads. This feature of the invention extends the scope or utility of the old "pulley-band" process and enables not only clincher casings to be manufactured therewith to advantage, but also straight-side casings for even the largest sizes of pneumatics. The more nearly radial disposition of the stress-resisting-elements adjacent the beads is deemed a better construction to resist chafing as it not only prevents rim cutting in clinchers, but also stiffens the walls of straight-side casings adjacent the beads. The manner in which the stress-resisting-elements are swung also enables the casing to be built higher and thinner than with the old process, or rather, more readily so made. It will not be endeavored to explain the reason for this, it being deemed sufficient to point out that in building the "pulley-band" flat or straight in cross-section on a drum which has been initially adjusted to a diameter greater than the beaded portions of the finished or cured casing, the width of the casing in the flat is less than its width in the finished or cured condition. In the size of tire previously given as an example—a 30 x 3½ clincher—this decrease in spacing is about half an inch. Of course, it is to be understood that this will vary with the size of the tire. The green casing in its shaping from the flat form increasing in width, probably because of the swing of the stress-resisting-elements into a more nearly radial relation with the beads. These unexpected results are obtained even when the shaping is performed merely by pushing upon the margins of the band without simultaneously pushing with an inflatable tube, or directly with air, against the inside central portion of the band. Obviously, this feature is of peculiar and especial advantage in manufacturing clincher casings as it eliminates, or at least diminishes, the tendency to enlarge the circumference of the elastic beads which heretofore has been troublesome in the old "pulley-band" process.

Shaping the tire "purely mechanically" between presser plates or platens of press without air pressure applied directly, or through the walls of a rubber tube, or any outward pressure means bulging the center of the band, is preferred as a step in the method because of its simplicity. No complicated apparatus is required as any means may be used to push the pressure plates towards one another. And an "air bag" may be readily introduced in the casing before or after it is shaped, a feature of especial advantage when such elastic walled containers are employed during the cure.

In the claims, the term "oversize" is used to mean a band that is built flat or curved in cross-section either entirely, or at least for the central portion of its width, at a diameter greater than the beaded portions of the finished casing and less than the tread portion thereof. The extent of "oversizing" is, of course, variable to suit requirements, the larger the building diameter, the less the building width and the less the tension developed in the stress-resisting-element of the finished casing.

As previously stated, the casing is preferably formed of stress-resisting-elements and rubber composition flat upon a building drum but it may be built flat in other ways, as, for instance, by winding a cord about spaced bead wires as disclosed in the prior art. Cord fabric severed from a rubberized web on a bias cutting machine is the preferred material, but square woven fabric may be used in my process with unusual facility, the building of the casing in the flat "oversize" and subsequent condensing of the margins of the fabric probably accounting for the greater ease with which woven fabric may be employed.

In the foregoing, I have endeavored to fully and adequately disclose the invention, but it is to be understood that I do not wish to be limited to details and aim to comprehend all modifications in the method and in the apparatus which are fairly within the disclosed principles. Many changes and alterations may be made without departing from the underlying principles of the invention and reference should therefore be made to the appended claims for an understanding of its scope.

Having thus described my invention, what I claim and desire to protect by Letters Patent is:

1. A method of making a tire casing for motor vehicles which consists in, making a pulley-band of greater girth centrally than marginally, subsequently forming this pulley-band into approximately tire shape while maintaining the order of its faces, and finally vulcanizing the casing.

2. A method of making a tire casing for motor vehicles which consists in, building a pulley-band whose girth is greater centrally than marginally, pressing upon the band marginally only so as to turn the same and bring them into an upright position while simultaneously distending its central portion, securing the band in the approximate tire form thus obtained, and finally vulcanizing the casing.

3. A method of making a tire casing for motor vehicles which consists in, building stress-resisting-elements and rubber composition into a pulley-band which is of greater girth at its center than at its margins, pressing the margins of the pulley-band toward one another to form it approximately into tire shape while the opposite faces of its tread portion are subjected to substantially equal fluid pressure, holding the pulley-band in approximate tire shape, and finally vulcanizing the casing.

4. A method of making a tire casing for motor vehicles which consists in, building stress-resisting-elements and rubber composition into a pulley-band which is of greater girth at its center than at its margins, pressing the margins of the pulley-band toward one another to form it approximately into tire shape while its opposite faces are subjected to equal fluid pressure, securing the marginal portions of the casing in a pre-determined position and sealing off the space between them, and finally vulcanizing the casing between rigid mold members while subjected to an internal fluid pressure.

5. That method of making a tire casing for motor vehicles which consists in, making a crescent-shaped casing of stress-resisting-elements and rubber composition and with bead members in its margins, forming the casing to approximately tire shape by engaging it marginally with abutment members which flatten the side walls of the casing above the beads after the latter turn to approximately their proper final relative angular position, securing the casing in approximately the shape thus obtained, and finally vulcanizing the casing in pre-determined form.

6. That method of making a tire casing for motor vehicles which consists in, making a crescent-shaped casing of stress resisting-elements and rubber and with bead members in its margins, forming the casing to approximately tire shape by engaging it marginally with abutment members which flatten the side walls of the casing above the beads after the latter turn to approximately their proper final relative angular position, securing the beaded portions of the casing thus shaped upon a sealing device in a pre-determined relation, introducing the casing and sealing device between rigid outer mold members, and finally vulcanizing the casing.

7. That method of making a tire casing for motor vehicles which consists in, making a casing oversize and of stress-resisting elements and rubber composition and incorporating bead members therein, subsequently turning the beaded portions of the casing and bringing them towards one another between members which simultaneously distend the tread-forming portion of the casing and while the opposite faces of the casing are under substantially equal fluid pressure, retaining the casing thus shaped in approximately tire form, and finally vulcanizing the casing between rigid outer mold members while subjected to an internal fluid pressure.

8. A method of making a tire casing for motor vehicles which consists in, building stress-resisting-elements and rubber composition into an annular band, pressing upon the opposite margins of the band while subjecting its opposite faces to an equal fluid pressure so as to form the band approximately tire-shaped in cross-section, and subsequently completely vulcanizing the band in the precise tire-shape desired.

9. In the manufacture of tire casings for motor vehicles, the step of transforming the casing from band to approximately tire form by approaching substantially rigid presser plates against the opposite margins of the band so as to progressively enlarge its girth and decrease its width while subjecting the opposite faces of the free portions of the band between the rigid pressed plates to substantially equal fluid pressure.

10. An apparatus for mechanically shaping tire casings having in combination, a pair of presser members and means for shifting at least one of the presser members relative to the other without developing a fluid pressure between the same and a band form of casing which has been introduced therebetween.

11. An apparatus for mechanically shaping tire casings having in combination, presser members each of a width adapted to engage the beaded margins and a substantial portion of the side walls of a casing in shaping the latter to tire form from a built-up band of stress-resisting-elements and rubber composition, an annular ring, means for supporting the ring substantially midway between the presser members, and means for bringing the presser members together and the beaded portions of the casing against the annular ring.

12. An apparatus for mechanically shaping tire casings having in combination, presser members each of width adapted to engage the beaded margins and a substantial portion of the side walls of a casing in shaping the latter to tire form from a built-up band of stress-resisting-elements and rubber composition, an annular ring, means for demountably supporting the ring substantially midway between the presser members, and means for bringing the presser members together and the beaded portions of the casing against the annular ring.

Signed at New York, in the county of New York, and State of New York, this 19 day of May, 1922.

WILLIAM J. STEINLE.

CERTIFICATE OF CORRECTION.

Patent No. 1,654,351.                      Granted December 27, 1927, to

WILLIAM J. STEINLE.

It is hereby certified that error appears in the printed specification of the above numbered patent requiring correction as follows: Page 3, line 66, for the compound word "cross-shaped" read "crescent-shaped"; and that the said Letters Patent should be read with this correction therein that the same may conform to the record of the case in the Patent Office.

Signed and sealed this 31st day of January, A. D. 1928.

Seal.

M. J. Moore,
Acting Commissioner of Patents.